(12) United States Patent
Cosner et al.

(10) Patent No.: US 11,214,388 B2
(45) Date of Patent: Jan. 4, 2022

(54) SELF-CONTAINED PAYLOAD ACCOMMODATION MODULE

(71) Applicant: Raytheon Company, Waltham, MA (US)

(72) Inventors: Christopher M. Cosner, Manhattan Beach, CA (US); Michael S. Baldwin, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 458 days.

(21) Appl. No.: 16/243,225

(22) Filed: Jan. 9, 2019

(65) Prior Publication Data

US 2020/0216199 A1    Jul. 9, 2020

(51) Int. Cl.
*B64G 1/64*    (2006.01)

(52) U.S. Cl.
CPC .................. *B64G 1/641* (2013.01)

(58) Field of Classification Search
CPC ........ B64G 1/428; B64G 1/503; B64G 1/641; B64G 1/66; B64G 2001/643; B64G 1/10; B64G 1/44; B64G 2001/641
See application file for complete search history.

(56) References Cited

U.S. PATENT DOCUMENTS

| | | | | |
|---|---|---|---|---|
| 3,478,986 A * | 11/1969 | Fogarty | .................. | B64G 1/646 244/159.4 |
| 5,052,640 A * | 10/1991 | Chang | .................... | B64G 1/222 244/172.7 |
| 5,242,135 A * | 9/1993 | Scott | ...................... | B64G 1/007 244/158.5 |
| 6,206,327 B1 * | 3/2001 | Benedetti | ................. | B64G 1/10 244/159.4 |
| 6,220,548 B1 * | 4/2001 | Hyman | .................. | B64G 1/503 244/172.6 |
| 8,550,408 B2 * | 10/2013 | Ross | ...................... | B64G 1/641 244/173.1 |

(Continued)

FOREIGN PATENT DOCUMENTS

| | | |
|---|---|---|
| EP | 3100954 A1 | 12/2016 |
| FR | 2839949 B1 | 1/2005 |
| FR | 3004166 B1 | 4/2015 |

OTHER PUBLICATIONS

Gerondakis, G.G "Get Away Special (gas) Educational Applications of Space Flight." Ieee Transactions on Education. 34.1 (1991): 5-10.

(Continued)

*Primary Examiner* — Medhat Badawi
(74) *Attorney, Agent, or Firm* — Renner, Otto, Boisselle & Sklar, LLP

(57) ABSTRACT

A self-contained payload module and method of deployment of a payload includes a housing that is configured to engage a propulsive payload adapter hub, at least one deployable payload that is arranged in an interior cavity of the housing and deployable using the propulsive payload adaptor hub, a payload electronics system arranged in the interior cavity, a thermal control system in communication with the at least one payload and arranged in the housing, and at least one antenna that is arranged on the housing and configured for wideband communication.

17 Claims, 7 Drawing Sheets

(56) References Cited

U.S. PATENT DOCUMENTS

| | | | | |
|---|---|---|---|---|
| 8,720,830 | B1* | 5/2014 | Szatkowski | B64G 1/44 244/172.7 |
| 8,876,062 | B1* | 11/2014 | Baghdasarian | B64G 1/66 244/172.6 |
| 9,004,409 | B1* | 4/2015 | Baghdasarian | B64G 1/66 244/172.6 |
| 9,796,484 | B2* | 10/2017 | Sauzay | B64G 1/007 |
| 2008/0237399 | A1* | 10/2008 | Caplin | B64G 1/1085 244/158.4 |
| 2013/0009012 | A1* | 1/2013 | Kobayashi | B64G 1/645 244/173.3 |
| 2013/0221162 | A1* | 8/2013 | Darooka | B64G 1/10 244/173.1 |
| 2016/0075453 | A1* | 3/2016 | Sauzay | B64G 1/10 244/171.3 |
| 2016/0102689 | A1* | 4/2016 | Madsen | B64G 1/641 244/173.1 |
| 2019/0039756 | A1* | 2/2019 | Beck | B26D 5/12 |
| 2019/0161215 | A1* | 5/2019 | Cosner | B64G 1/10 |
| 2020/0216199 | A1* | 7/2020 | Cosner | B64G 1/641 |

OTHER PUBLICATIONS

Toorian, Armen et at. "The Cubesat Approach to Space Access." Ieee Aerospace Conference Proceedings. (2008).
Unpublished U.S. Appl. No. 15/827,524, filed Nov. 30, 2017.
International Search Report and Written Opinion of corresponding International Application PCT/US2019/051031 dated Dec. 6, 2019.
Maly et al.; "Adapter Ring for Small Satellites on Responsive Launch Vehicles"; Proceedings of the AIAA/7th Responsive Space Conference; American Institute of Aeronautics & Astronautics 7th Responsive Space Conference, Los Angeles, CA, Apr. 27-30, 2009; Apr. 1, 2009 (Apr. 1, 2009), p. 9pp.

\* cited by examiner

SELF-CONTAINED PAYLOAD ACCOMMODATION MODULE

FIELD OF THE INVENTION

The invention relates to payloads that are deployable from an attachment hub, and more particularly to a device and method for accommodating payloads and deploying payloads from an ESPA-class attachment hub.

DESCRIPTION OF THE RELATED ART

Payloads are generally deployable from an evolved expendable launch vehicle (EELV) secondary payload adapter (ESPA) that is arranged as part of a space vehicle. Prior to deployment, these secondary payloads are carried by the space vehicle and accommodated in accordance with requirements including those for volume, mass, power, thermal dissipation, dimensions, spacing, etc. In an effort to conform to existing accommodation requirements of a host vehicle, such as an ESPA-class bus or hub connected to a primary space vehicle, prior attempts at providing deployable payloads have been limited to using small and self-contained payload modules that are attachable to the perimeter of the ESPA. However, the prior payloads are disadvantageous in that the small payloads are not operationally-sized and may also have a constrained field-of-view due to the arrangement of the payloads within the space vehicle.

SUMMARY OF THE INVENTION

The payload module described herein provides a housing having a cylindrical cavity that accommodates the payload aperture, a set of payload electronics, a thermal control system for the payload, and an antenna for wideband communication. The arrangement of the payload within the cylindrical cavity of the housing enables a clear and increased field-of-view (FOV) area for the payload as compared with the hindered FOVs provided by conventional payload accommodation. The arrangement of payloads within the cavity also enables the payload module to accommodate more capable payloads as compared with conventional accommodation attempts. Additionally, the arrangement of the thermal control system enables the payload module to have greater power and, therefore, increased mission utility.

The payload module is also self-contained such that operational characteristics of the payload are able to be tested by a payload provider before attachment or integration with a propulsive payload adaptor hub, or ESPA-class hub. As a result, the payload's performance can be certified before it is integrated with the hub. Accordingly, a failure during the testing of either the ESPA-class hub or the payload prior to integration will not preclude production and testing of the other of the hub or the payload. Examples of operational characteristics that may be tested include functional, dynamic, vibration, acoustic, thermal, performance, electromagnetic capability, electromagnetic interference, and/or qualification.

Additionally, an optimal volume for the payload module may be determined based on the structural capability of the space vehicle in which the payload module is to be integrated and used, such as in a space vehicle including the ESPA-class hub, other attachment hubs, and at least one primary vehicle. Determining the maximum available volume for the payload module ensures that the space vehicle will not be overloaded or structurally impaired by arranging the self-contained payload module for axial alignment with the other attachment hubs and primary vehicles.

According to an aspect of the invention, a self-contained payload module is configured for engagement with a propulsive payload adapter hub.

According to an aspect of the invention, a payload accommodation module includes an internal thermal control system for the payloads accommodated in the module.

According to an aspect of the invention, a payload module is configured for engagement with a propulsive ESPA-class hub and enables the payloads to have an unhindered FOV.

According to an aspect of the invention, a method of deployment of a payload from a propulsive payload adapter hub includes providing a self-contained payload accommodation module and testing the self-contained payload accommodation module prior for operational characteristics prior to integration with the propulsive payload adapter hub.

According to an aspect of the invention, a payload module includes a housing that is configured to engage a propulsive payload adapter hub, at least one deployable payload that is arranged in an interior cavity of the housing and deployable by the propulsive payload adapter hub, a payload electronics system arranged in the interior cavity, a thermal control system in communication with the at least one payload and arranged in the housing, and at least one antenna that is arranged on the housing and configured for wideband communication.

According to an embodiment of any paragraph(s) of this summary, the housing and the interior cavity may be cylindrical.

According to an embodiment of any paragraph(s) of this summary, the at least one payload may be arranged within an outer perimeter of the housing and the at least one antenna may be mounted to the housing outside the outer perimeter.

According to an embodiment of any paragraph(s) of this summary, the at least one payload may be cylindrical in shape and has an unhindered circular field-of-view.

According to an embodiment of any paragraph(s) of this summary, the propulsive payload adapter hub may be an Evolved Expendable Launch Vehicle Secondary Payload Adapter (ESPA) class hub.

According to an embodiment of any paragraph(s) of this summary, the thermal control system may include a plurality of radiator panels arranged on an outer peripheral surface of the housing.

According to an embodiment of any paragraph(s) of this summary, the payload module may include a hub fastener that is configured to connect a perimeter of the housing to the propulsive payload adapter hub.

According to an embodiment of any paragraph(s) of this summary, the hub fastener may be a ring-shaped clamp band arranged around the perimeter of the housing.

According to an embodiment of any paragraph(s) of this summary, the primary vehicle fastener may be arranged on the housing opposite the hub fastener and configured to connect the housing to a primary vehicle opposite the propulsive payload adapter hub.

According to an embodiment of any paragraph(s) of this summary, the primary vehicle fastener may be a ring-shaped clamp band arranged around the perimeter of the housing.

According to another aspect of the invention, a method of deployment of a payload from a propulsive payload adapter hub includes inserting at least one deployable payload with payload electronics within an interior cavity of a housing of a payload module, inserting a thermal control system in the housing and arranging the thermal control system for communication with the at least one payload, arranging at least one antenna on the housing that is configured for wideband communication, attaching the housing to the propulsive payload adapter hub, and deploying the payload using the propulsive payload adapter hub.

According to an embodiment of any paragraph(s) of this summary, the method may further include arranging the at least one payload to have an unhindered field-of-view.

According to an embodiment of any paragraph(s) of this summary, the method may include testing the payload module for at least one operational characteristic before attaching the payload housing to the propulsive payload adapter hub, wherein the operational characteristic includes at least one of functional, dynamic, vibration, acoustic, thermal, performance, electromagnetic capability, electromagnetic interference, qualification, and any combination thereof.

According to an embodiment of any paragraph(s) of this summary, the method may further include attaching the payload module to a primary vehicle.

According to an embodiment of any paragraph(s) of this summary, the method may further include arranging the payload module, the propulsive payload adapter hub, and the primary vehicle to be coaxially stacked relative to each other.

According to an embodiment of any paragraph(s) of this summary, the method may further include determining a structural capability of the primary vehicle and the propulsive payload adapter hub, determining a maximum volume available for the payload module based on the structural capability of the primary vehicle and the propulsive payload adapter hub, and forming the payload module to have a volume that is less than or equal to the maximum volume available.

According to an embodiment of any paragraph(s) of this summary, the method may further include arranging the at least one payload within an outer perimeter of the housing and mounting the at least one antenna to the housing outside the outer perimeter.

According to an embodiment of any paragraph(s) of this summary, the method may further include selecting a propulsive payload adapter hub from a plurality of different propulsive payload adapter hubs.

According to an embodiment of any paragraph(s) of this summary, the method may further include using a mechanical interface to connect a perimeter of the housing to a perimeter of the propulsive payload adapter hub.

According to an embodiment of any paragraph(s) of this summary, inserting the thermal control system in the housing may include arranging a plurality of radiator panels on an outer peripheral surface of the housing.

According to an aspect of the invention, a payload module includes a housing configured to engage a propulsive payload adapter hub, and at least one deployable payload that is arranged in an interior cavity of the housing and deployable by the propulsive payload adapter hub, wherein the payload module is configured to enable communication between the at least one payload and the propulsive payload adapter hub via at least one antenna that is arranged on the housing.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have particular application for payloads for aerospace deployment, generally outside of a planet's atmosphere, from a propulsive payload adapter hub, such as an ESPA-class hub or ring having been carried into outer space by an ESPA-class vehicle. Other possible applications include any suitable payload-carrying vehicles such as airplane pods. The present application may also be applicable to modules for release in other environments, such as in the atmosphere or under water. For example, payload-carrying airplane pods and submarine torpedoes may be other suitable applications. The principles described herein are more particularly directed to a self-contained payload module that is attached to the ESPA-class hub and contains a payload for deployment using propulsion of the ESPA-class hub, and a method of deployment of the payload from the ESPA-class hub.

The present application provides a self-contained payload module having an internal cavity that accommodates the payload with payload electronics and is configured for internal thermal regulation and data downlink capabilities. Providing thermal control and data downlink internally within the payload module enables operational characteristics of the payload module and the payload to be tested prior to integration with the ESPA-class hub. The payload module includes a cylindrical cavity in which the cylindrical payload is arranged to have an unhindered and increased circular FOV area in contrast to conventional payloads having a FOV area that is hindered by the arrangement of the payloads relative to the ESPA-class hub. The arrangement of the payloads within the payload module enables more capable payloads to be accommodated and the arrangement of the thermal control system enables the payload module to have more power as compared with conventional payloads.

Figure 1:
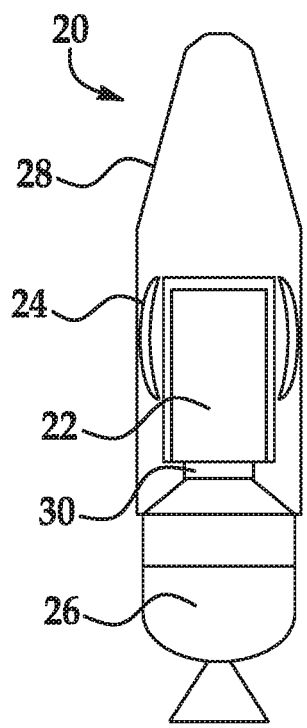
FIG. 1 is a schematic drawing showing a conventional aerospace vehicle.
Figure 2:
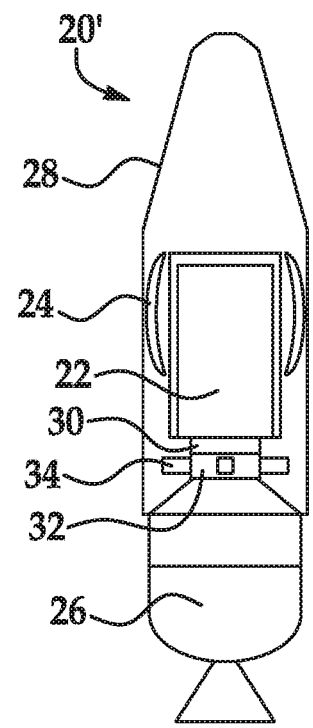
FIG. 2 is a schematic drawing showing another conventional aerospace vehicle.

Referring first to FIGS. 1 and 2, conventional aerospace vehicles 20, 20' may be used for transporting equipment out of a planet's atmosphere and into a release environment having low or no atmosphere, low or no gravity, or being typically referred to as outer space. The aerospace vehicles 20, 20' have a primary vehicle 22 with an antenna 24, a primary stage launch vehicle 26, and a fairing 28 surrounding the primary vehicle 22 and an attachment hub 30. The fairing 28 is detachably releasable relative to a fuselage of the vehicle 20, 20' and protects the primary vehicle 22 and the attachment hub 30 during transport. FIG. 2 shows the aerospace vehicle 20' further including an additional attachment hub 32 which is a propulsive ESPA-class hub. An ESPA-class payload 34 is attached to the ESPA-class hub 32. However, the FOV area of the payload 34 is limited due to the shape of the payload 34 and the arrangement of the payload 34 on the ESPA-class hub 32.

Figure 3:
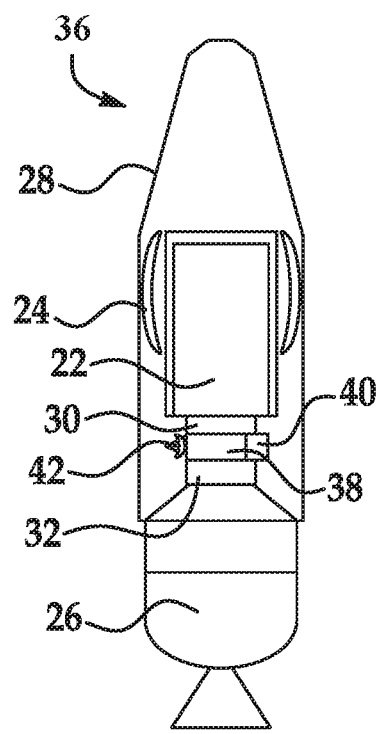
FIG. 3 is a schematic drawing showing an aerospace vehicle including a payload module according to an embodiment of the present invention.

FIG. 3 shows an exemplary aerospace vehicle 36 according to an embodiment of the present invention that includes a self-contained payload module 38 having at least one payload, a thermal control system 40 in communication with the payload, and at least one antenna 42 that is arranged on the payload module 38 and configured for wideband communication of the payload. In an exemplary embodiment, the payload module 38 may be arranged between the hub 30 and the ESPA-class hub 32. The aerospace vehicle 36 further includes the primary vehicle 22, the primary stage launch vehicle 26, and the fairing 28 as shown in FIGS. 1 and 2. More than one primary vehicle 22 may be provided or the primary vehicle 22 may be omitted, and more or fewer attachment hubs may be provided. The fairing 28 is detachable in any suitable manner to allow release of the attachment hubs 30, 32, 38 from the remainder of the aerospace vehicle 36 when in a suitable release environment.

Figure 4:
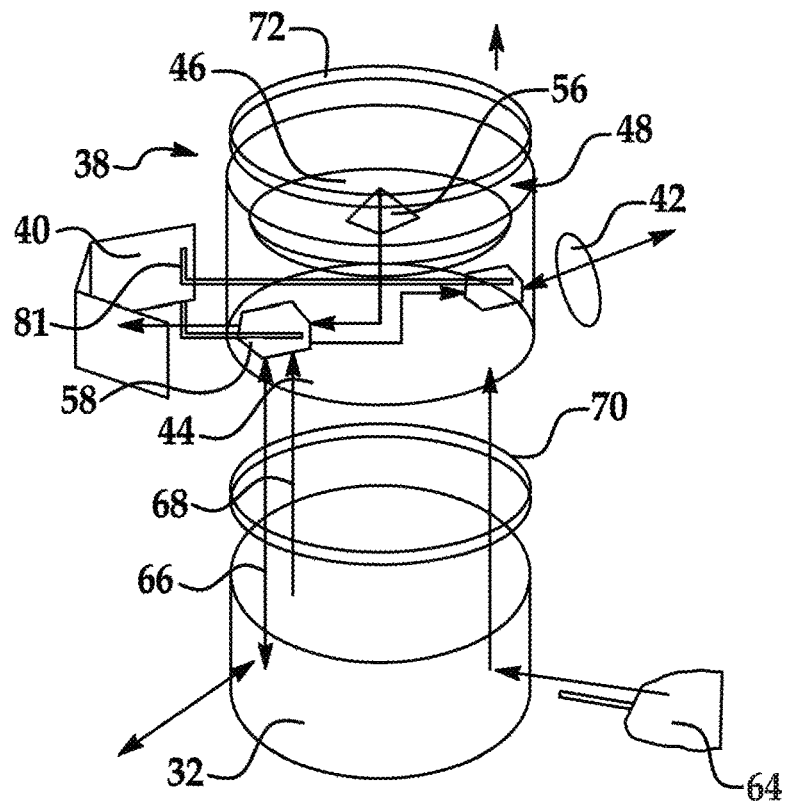
FIG. 4 is a schematic drawing showing details of the payload module shown in FIG. 3.

Referring now to FIG. 4, features of the payload module 38 are schematically shown. The payload module 38 includes a housing 44 that receives and surrounds at least one payload 46. A plurality of payloads may be stacked within the housing 44 when in a stowed position prior to deployment. The housing 44 is cylindrical in shape or ring-shaped and defines an aperture or interior cavity 48 in which the payload 46 is arranged. The payload 46 is circular or cylindrical in shape and concentrically arranged within the housing 44. Forming the housing 44 to be cylindrical is advantageous in enabling a clear and increased circular FOV area for the circular payload 46, as compared with conventional ESPA-class payloads. For example, a diameter of the FOV area may be between 1.25 and 1.75 meters, which may be approximately three times greater than conventional payloads. The interior cavity 48 is able to accommodate additional payloads as compared with conventional payload accommodation mechanisms. In other embodiments, the payload 46 may have another suitable shape and the interior cavity 48 may have a corresponding shape to accommodate the payload 46. The shape of the payload 46 and the housing 44 may be dependent on a particular application or mission.

Figure 5:
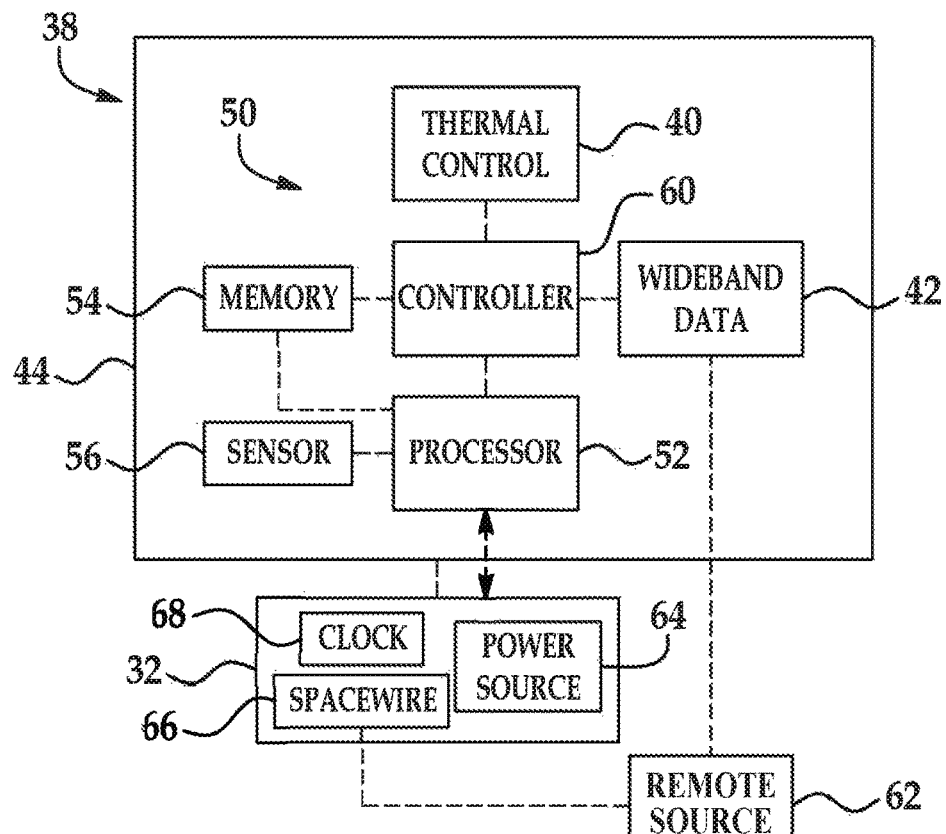
FIG. 5 is a schematic drawing showing a control system for the payload module shown in FIG. 3.

Referring in addition to FIG. 5, the payload module 38 includes a main control system 50 that is in communication with the thermal control system 40, the antenna 42, and other payload electronics that are arranged in the housing 44 of the payload module 38. Any suitable payload electronics may be arranged in the housing 44 and the electronics may be used for completing a particular mission. Examples of payload electronics include visual, audio, imaging, power-providing, communication, propulsive, command, and control equipment. Control equipment may include mechanical, electrical, chemical, radio-frequency (RF), chemical, and thermal components, for example. Specific examples of equipment may include a long-range imaging camera, antenna, repeater, battery, fuel, solar array, or science experiment.

The main control system 50 includes any suitable processor 52, and a memory 54 that is in communication with the processor 52 and may store a mission for a specific application. The payload module 38 includes at least one sensor 56 that is in communication with the processor 52. Sensors may be arranged on the payload 46 and the housing 44. Any suitable type of sensor may be used and a plurality of sensors may be provided. Examples of suitable types of sensors include imaging or camera sensors, acoustic or sound sensors, environmental sensors, flow or fluid velocity sensors, and navigation sensors for detecting inertia, turning coordination, or other detectable features. Other suitable sensors include position, speed, and acceleration sensors, and optical sensors. Pressure sensors, density sensors, thermal sensors, proximity sensors, time-of-travel sensors, and range sensors. The aforementioned types of sensors are merely exemplary and many other types of sensors may be suitable.

In an exemplary embodiment, the sensor 56 may be used to sense heat of the payload module 38 or the payload 46 and provide an output 58 to the processor 52 of the main control system 50. If the processor 52 determines that the temperature exceeds a predetermined value, the processor 52 communicates with a controller 60, which is used to control the thermal control system 40. The thermal control system 40 may include any suitable adiabatic device arranged within or on the payload module 38, such as radiator panels. The thermal control system 40 is arranged such that the power of the payload module 38 may be increased to around six times greater as compared with conventional payload power supplies.

The sensor 56 may be used to provide other outputs to the processor 52 and the controller 60 may be used to operate the antenna 42 that is configured for wideband communication between the payload module 38 and a remote source 62, such as the ground. Any type of antenna that is configured for wideband communication may be suitable, such as wire, aperture, travelling wave, microstrip, and log-periodic. Directional and omnidirectional antennas may be suitable. Providing the wideband communication antenna 42, the main control system 50, and the thermal control system 40 in the payload module is advantageous in that the thermal dissipation of the payload 46 and the payload electronics is managed internally within the payload module 38 prior to integration of the payload module 38 in the aerospace vehicle 36.

Propulsion of the payload 46 is performed using the ESPA-class hub 32 which includes electrical interfaces with the payload module 38 and a simple mechanical interface with the payload module 38. The processor 52 is in communication with various electrical components of the ESPA-class hub 32 for communication between the payload module 38 and the ESPA-class hub 32. The ESPA-class hub 32 includes a power source 64 that is configured to supply power or propulsion to the payload 46. The power source 64 may be any suitable power source, such as a solar array, and provide any suitable amount of power. For example, the power source 64 may provide 28 volts DC power. The ESPA-class hub 32 further includes a spacecraft communication network 66, such as a SpaceWire that is in communication with the processor 52 of the payload module 38 for providing telemetry and command to the payload 46 from a remote source 62. A master clock 68 is arranged in the ESPA-class hub 32 for synchronization of the payload module 38 and the ESPA-class hub 32, and time-tagging.

In addition to the electrical interfaces between the ESPA-class hub 32 and the payload module 38, the ESPA-class hub 32 and the payload module 38 are also connected by at least one mechanical interface 70. Providing the self-contained payload module 38 enables the mechanical interface 70 to be less complex as compared with conventional attachment or coupling mechanisms between the ESPA-class hub 32 and other hubs. Using the self-contained payload module 38 and a less complex mechanical interface 70 between the payload module 38 and the ESPA-class hub 32 is advantageous in that integration of the payload module 38 and the ESPA-class hub 32 may be less complex as compared with conventional payload and hubs.

In an exemplary embodiment, the mechanical interface 70 may be a clamp band that is circular or semi-circular. The mechanical interface 70 may include more than one clamp band such that each of the payload module 38 and the ESPA-class hub 32 have a clamp band that is in alignment with the other clamp band. In other exemplary embodiments, the mechanical interface 70 may include at least one bolted connection. Any suitable fastening mechanism for securing the ESPA-class hub 32 and the payload module 38 may be used.

The payload module 38 may further have another mechanical interface 72 with the primary vehicle 22 (as shown in FIG. 3). The mechanical interface 72 is arranged on the payload module 38 opposite the mechanical interface 70 and the ESPA-class hub 32 when the payload module 38 is assembled or integrated with the primary vehicle 22 and the ESPA-class hub 32. The payload module 38 is axially aligned with the primary vehicle 22, the ESPA-class hub 32, and any other attachment hubs that may be provided in the aerospace vehicle 36. The components may be arranged in any suitable axial arrangement. The payload module 38 may be stacked below or axially adjacent the primary vehicle 22 and the ESPA-class hub 32 such that the ESPA-class hub 32 is axially arranged between the primary vehicle 22 and the payload module 38. In other embodiments, the payload module 38 may be stacked above the ESPA-class hub 32 such that the payload module 38 is axially arranged between the primary vehicle 22 and the ESPA-class hub 32. Additional attachment hubs may also be arranged between the components.

Figure 8:
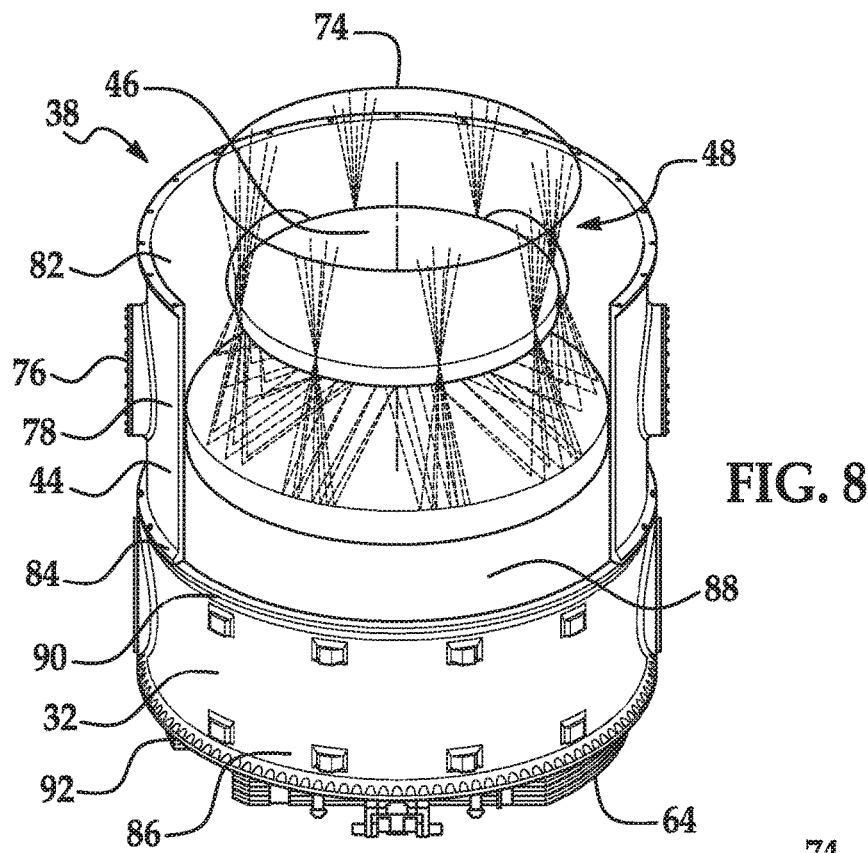
FIG. 8 is a schematic drawing showing a perspective view of an interior cavity of the payload module shown in FIG. 6.
Figure 9:
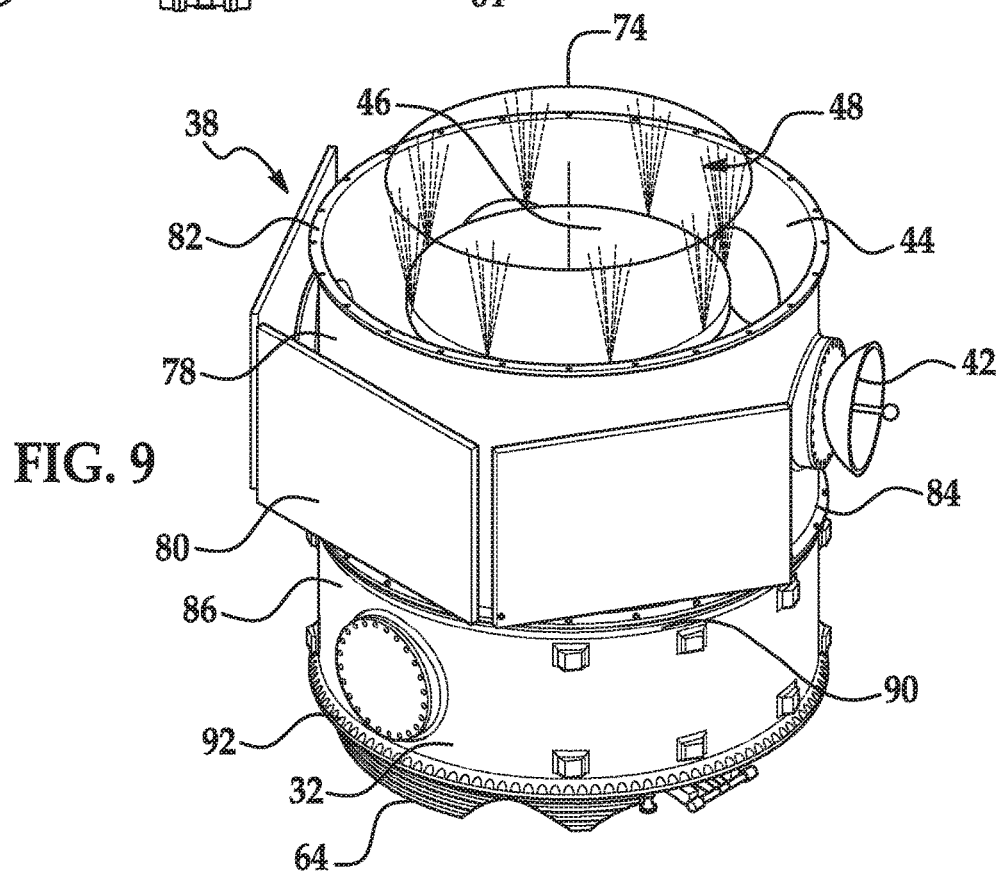
FIG. 9 is a schematic drawing showing a perspective view of the payload module shown in FIG. 6 that further includes a thermal regulating device and an antenna.
Figure 10:
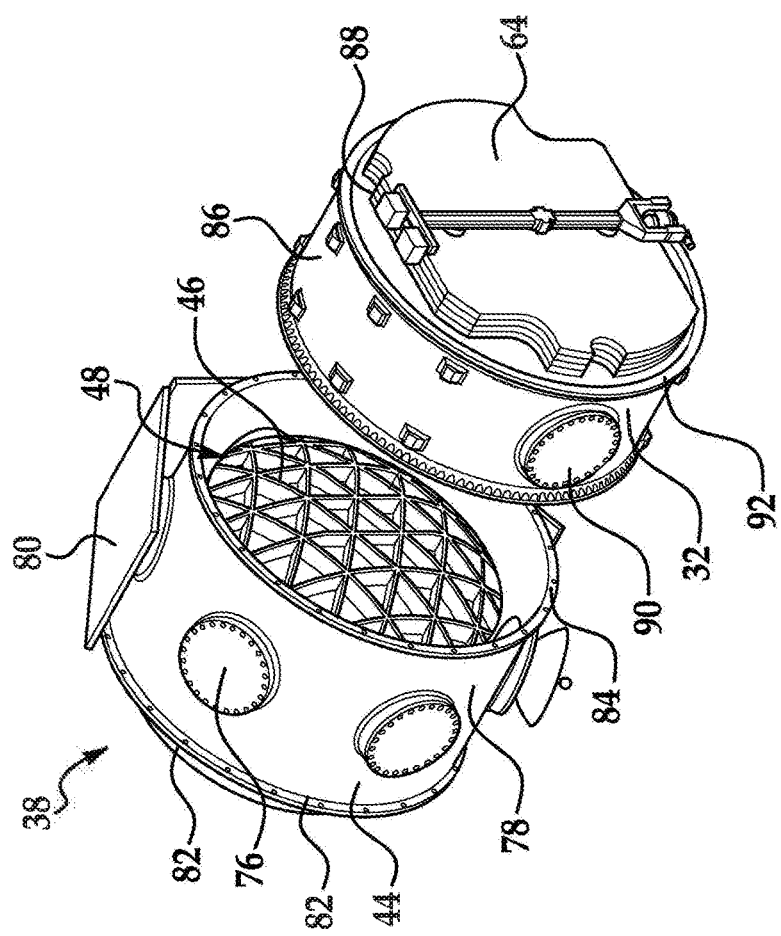
FIG. 10 is a schematic drawing showing a perspective view of the payload module and the propulsive payload adaptor hub shown in FIG. 6 having a solar array arranged in a stowed position within the propulsive payload adaptor hub.

Referring now to FIGS. 6-12, an exemplary payload module 38 is shown. The payload module 38 includes the ring-shaped or cylindrical housing 44 which defines the interior cavity 48. As best shown in FIG. 10, the interior cavity 48 of the cylindrical housing 44 is open through the cylindrical housing 44 to the ESPA-class hub 32. At least one payload 46 is arranged in the interior cavity 48 and the payload 46 is circular in shape and has a circular FOV 74. More than one payload may be stacked within the interior cavity 48, as shown in FIG. 8. The payload 46 includes suitable payload electronics arranged within the interior cavity 48 and on the housing 44, such as an antenna, sensor, and other opto-mechanical hardware. At least one sensor 76 may be arranged on the outer peripheral surface 78 of the cylindrical housing 44 and in communication with the payload 46. A plurality of sensors may be arranged along the outer peripheral surface 78 and in an exemplary embodiment, the sensors may be equidistantly spaced and similarly sized and shaped.

Figure 11:
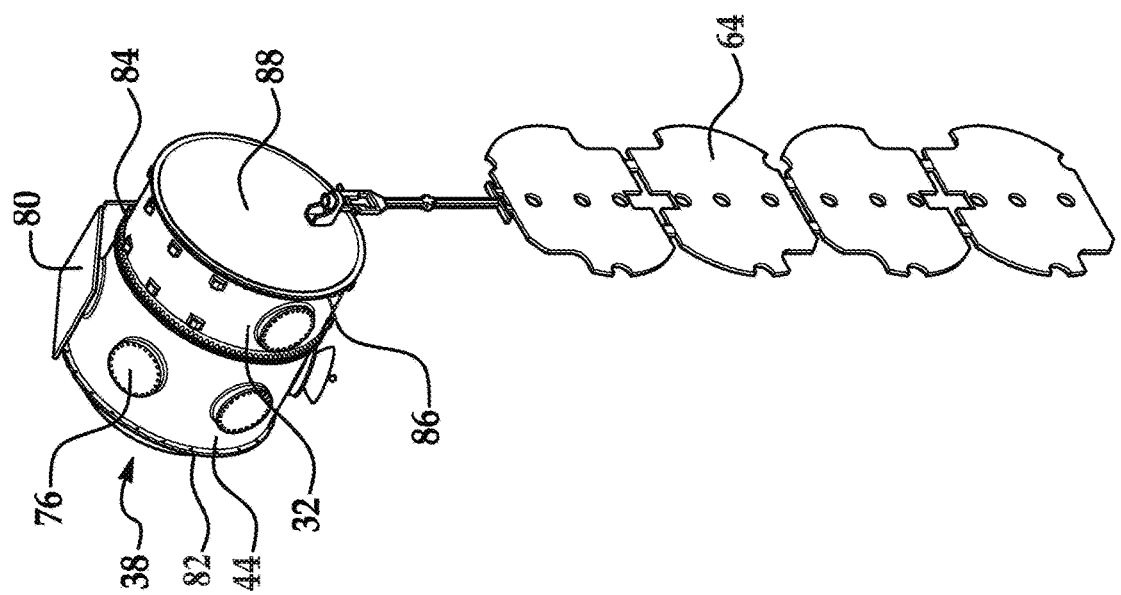
FIG. 11 is a schematic drawing showing a perspective view of the payload module and the propulsive payload adaptor hub shown in FIG. 10 having the solar array arranged in a deployed position.

As best shown in FIGS. 9-11, the thermal control system 40 may include at least one thermal regulating device 80 arranged on the outer peripheral surface 78 of the cylindrical housing 44. The thermal regulating device 80 may include at least one radiator panel 80, at least one heat pipe 81, thermal electric coolers, pumped fluid systems, and/or any other suitable thermal regulating device for preventing the payload module 38 from overheating or from cold temperatures. Pumped fluid systems may be particularly advantageous in underwater and atmospheric applications. The thermal regulating device 80 may include passive or active components, such as insulation, blankets, coatings, heaters, louvers, and any other suitable components. Suitable coatings may include a Room Temperature Vulcanization (RTV) coating or a grafoil coating. A plurality of radiator panels and heat pipes may be provided. The radiator panel 80 may have any suitable shape, such as rectangular. The plurality of radiator panels may have similar shapes and sizes and may be arranged adjacently along a portion of the outer peripheral surface 78. Similarly, heat pipes may take any configuration that transports the heat to the radiators. The radiator panels and the heat pipes may be equidistantly spaced relative to each other.

As best shown in FIG. 9, the antenna 42 configured for wideband communication of the payload module 38 is also arranged along the outer peripheral surface 78 and is arranged adjacent the plurality of radiator panels. The antenna 42 is arranged outside of the perimeter of the payload module 38. The antenna 42 may be parabolic in shape, or have any other suitable shape. The payload module 38 further includes mechanical interfaces for connection with adjacent hubs. Clamp bands 82, 84 are arranged on opposing sides of the payload module 38. In a configuration in which the payload module 38 is arranged between the primary vehicle 22 (shown in FIG. 3) and the ESPA-class hub 32, the clamp band 82 may be used for securing the payload module 38 to the primary vehicle 22 and the clamp band 84 may be used for securing the payload module 38 to the ESPA-class hub 32 opposite the primary vehicle 22.

Figure 12:
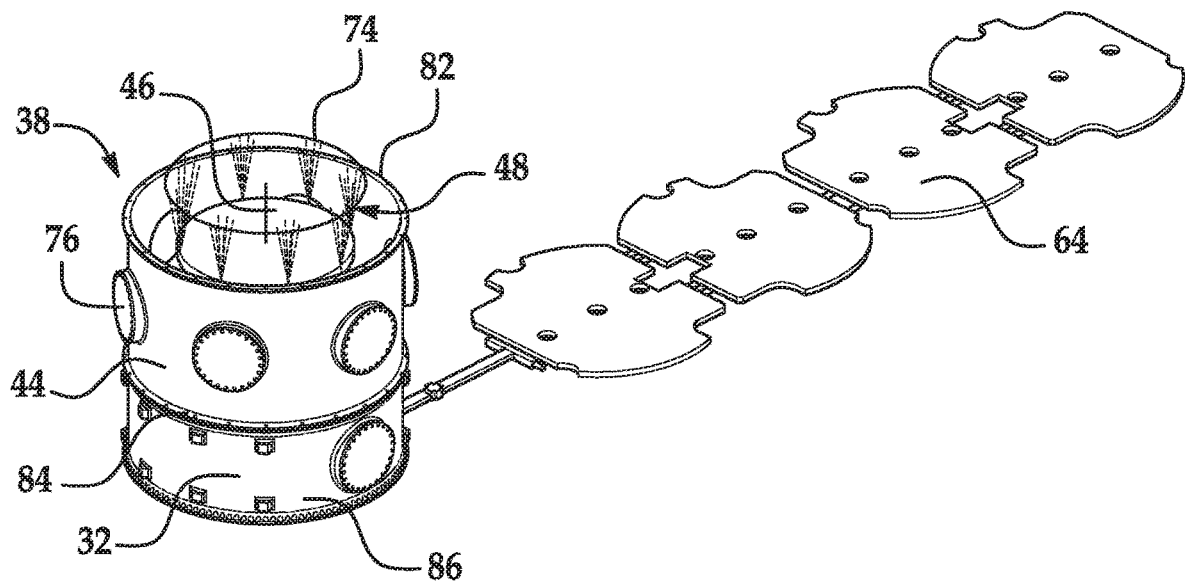
FIG. 12 is a schematic drawing showing another perspective view of the payload module and the propulsive payload adaptor hub shown in FIG. 11.

The payload module 38 may be integrated and used with any suitable ESPA-class hub 32. The exemplary ESPA-class hub 32 includes a ring-shaped or cylindrical housing 86. The ESPA-class hub 32 includes the power source 64 which is in the form of a solar array. The solar array may be a 4-panel solar array. The power source 64 is moveable from a stowed position in which the solar array is stacked within the ESPA-class hub 32, as shown in FIGS. 6-10, to a deployed position, as shown in FIGS. 11 and 12. The ESPA-class hub 32 further includes a propulsion module 88 that is arranged between the power source 64 and the payload module 38, as best shown in FIGS. 8, 10 and 11. Any suitable propulsion module may be used, such as a hydrazine thruster. Clamp bands 90, 92 may also be arranged on opposing sides of the ESPA-class hub 32 for mounting to the payload module 38 and the primary stage launch vehicle 18 (shown in FIG. 3). Although the payload module 38 is shown as being arranged above the ESPA-class hub 32, in alternative embodiments, the payload module 38 maybe arranged below the ESPA-class hub 32.

Figure 6:
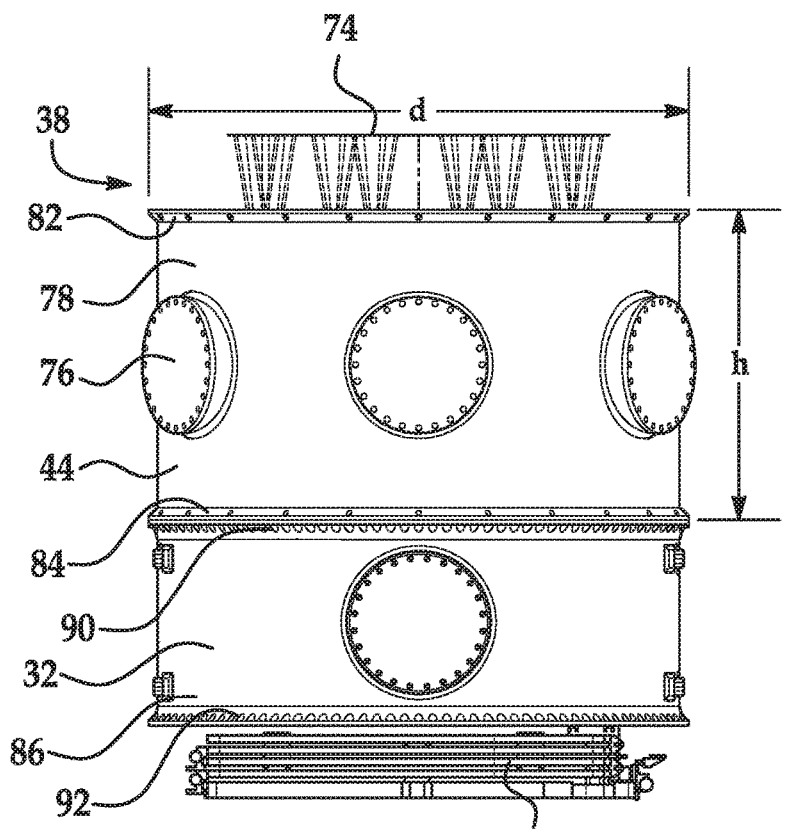
FIG. 6 is a schematic drawing showing a side perspective view of the payload module shown in FIG. 3 and a propulsive payload adaptor hub to which the payload module is attached.
Figure 7:
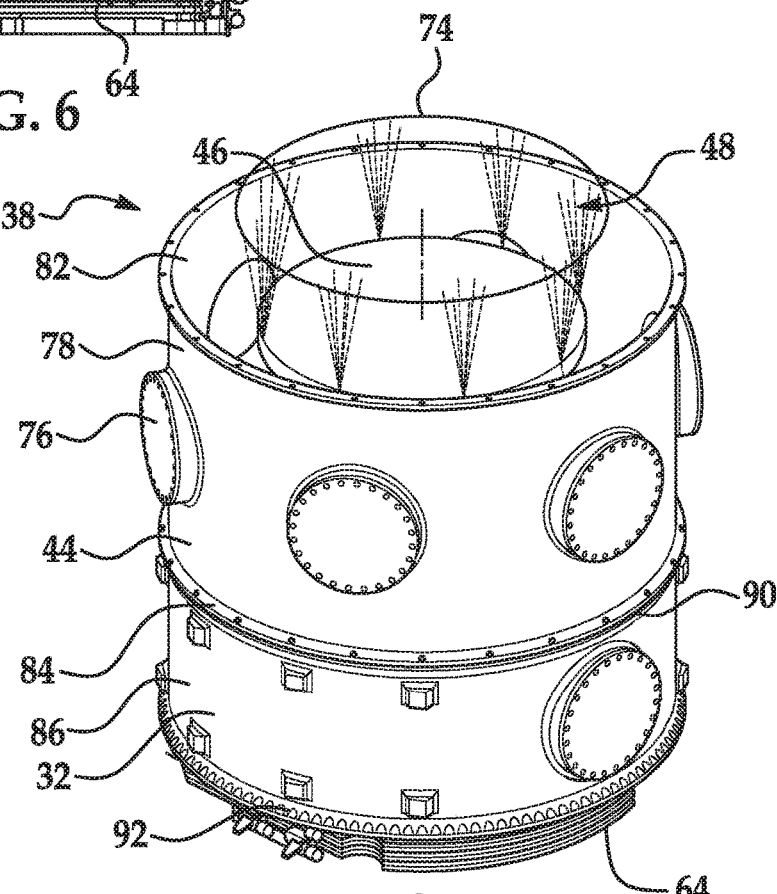
FIG. 7 is a schematic drawing showing a perspective view of the payload module and the propulsive payload adaptor hub shown in FIG. 6.

The payload module 38 may have any suitable dimensions and weight, and the configuration of the payload module 38 may be selected based on a predetermined application and the attachment hubs and additional vehicles that form the entire aerospace vehicle. With reference to FIG. 6, in an exemplary embodiment, the payload module 38 may have a height h between 0.5 meters and 2.0 meters, a diameter d between 1.0 meters and 2.0 meters, and a mass between 375 kilograms and 425 kilograms. The payload module 38 may be formed to have any other suitable height, diameter, and mass. As the payload module 38 is stacked with the primary vehicle 22 and the ESPA-class hub 32 and thus loading the primary vehicle 22 and the ESPA-class hub 32, the dimensions of the payload module 38 may be selected based on the structural capability of the primary vehicle 22 and the ESPA-class hub 32. The outer diameter d of the payload module 38 is fixed, such that the available volume for the payload module 38 may be determined using the height h of the payload module 38.

Figure 13:
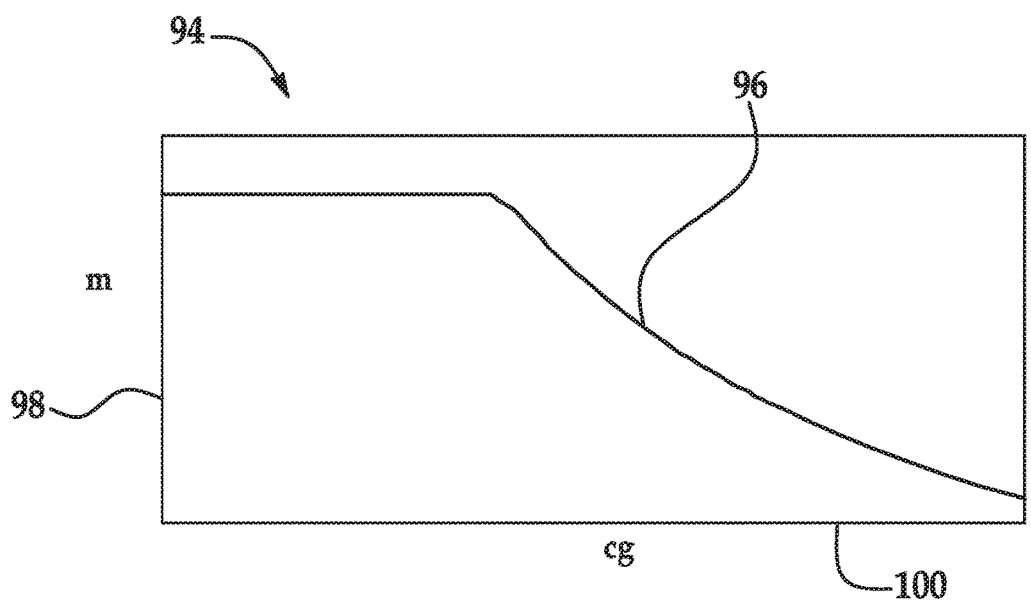
FIG. 13 is a schematic drawing showing a graph of a structural capability of a launch vehicle adapter.

An optimal height h of the payload module 38 may be determined using the masses and centers of gravity of the primary vehicle 22, the ESPA-class hub 32, and the payload module 38. The optimal height h of the payload module 38 may be determined based on the structural capability of the aerospace vehicle 36 (shown in FIG. 3) to be integrated with the payload module 38, which, in exemplary embodiments, includes the primary vehicle 22 and the EESA-class hub 32. As shown in a graph 94 of FIG. 13, the structural capability of launch vehicle adapters may be approximated by a curve 96 showing the relationship of the mass m on the y-axis 98 and the center of gravity cg of the aerospace vehicle 36, which includes the primary vehicle 22 and the ESPA-class hub 32, on the x-axis 100. The curve 96 is represented by Equation 1, with Σmass being the total mass of the space vehicle with the payload module 38, Σcg being the center of gravity for the space vehicle with the payload module 38, S being the slope of the curve 96, and I being the mass intercept.

$$\Sigma mass = S(\Sigma cg) + I \qquad \text{Equation 1}$$

In a configuration in which the payload module 38 is stacked below or axially adjacent the primary vehicle 22 and the ESPA-class hub 32, the height h of the payload module 38 is determined using the combined center of gravity and mass of the primary vehicle 22 and the ESPA-class hub 32 together. The center of gravity of the payload module 38 may be approximately equal to half of the height h of the payload module 38. The value of Σmass in Equation 1 is equal to the sum of the mass of the primary vehicle 22 and the ESPA-class hub 32 along with the payload module 38. The value of Σcg is determined using Equation 2, with $m_{cbd}$ being the combined mass of the primary vehicle 22 and the ESPA-class hub 32, $cg_{cbd}$ being the combined center of gravity of the primary vehicle 22 and the ESPA-class hub 32, and $m_{pm}$ being the mass of the payload module 38.

$$\Sigma cg = \frac{m_{cbd}(cg_{cbd}) + m_{pm}\left(\frac{1}{2}h\right)}{\Sigma mass} \qquad \text{Equation 2}$$

Accordingly, Equation 2 may be substituted into Equation 1 to form Equation 3 which may be used to determine the maximum value of the height h of the payload module 38.

$$h = \frac{\frac{(\Sigma mass^2 - I\Sigma mass)}{S} - m_{cbd}(cg_{cbd})}{\left(m_{cbd} + \frac{1}{2}m_{pm}\right)} \qquad \text{Equation 3}$$

Equation 3 may be used to determine the maximum available volume or alternatively, the available mass for the payload module 38. The payload module 38 may be cylindrical such that the volume of the payload module 38 is determined using Equation 4, with $v_{pm}$ being the volume available for the payload module 38, r being the radius, or half of the diameter d of the payload module 38, and h being the height of the payload module 38 determined using Equation 3.

$$v_{pm} = \pi(r^2)h \qquad \text{Equation 4}$$

In a non-limiting specific exemplary embodiment in which the primary vehicle 22 is vertically stacked on top of the ESPA-class hub 32, the masses of the primary vehicle 22, the ESPA-class hub 32, and the payload module 38 may be 3500 kilograms, 300 kilograms, and 300 kilograms, respectively. The center of gravity of the primary vehicle 22 may be 1.75 meters and the height of the ESPA-class hub 32 may be 1 meter. Accordingly, the combined mass $m_{cbd}$ of the primary vehicle 22 and the ESPA-class hub 32 is 3800 kilograms. The combined center of gravity $cg_{cbd}$ of the primary vehicle 22 and the ESPA-class hub 32 is determined using Equation 5, with $m_{pv}$ being the mass of the primary vehicle 22, $m_{eh}$ being the mass of the ESPA-class hub 32, $h_{pv}$ being the height of the primary vehicle 22, and $h_{eh}$ being the height of the ESPA-class hub 32.

$$cg_{cbd} = \frac{m_{pv}\left(\frac{1}{2}h_{pv} + h_{eh}\right) + m_{eh}(h_{eh})}{m_{pv} + m_{eh}} \qquad \text{Equation 5}$$

Using Equation 5, the combined center of gravity $cg_{cbd}$ is determined to be approximately 2.61 meters. Equation 3 may then be used to determine that the maximum height h for the payload module 38 is approximately 1.87 meters. In an exemplary embodiment in which the payload module 38 has a fixed diameter d of 1.5 meters, the volume of the cylindrical payload module 38 is approximately 3.30 cubic meters. In contrast, conventional payloads may be rectangular in shape and have a volume that is a third of the volume of the payload module 38. Similarly, a surface area of the conventional rectangular payload may be a third of the area of the cylindrical payload module 38 and the cylindrical payload 46.

Figure 14:
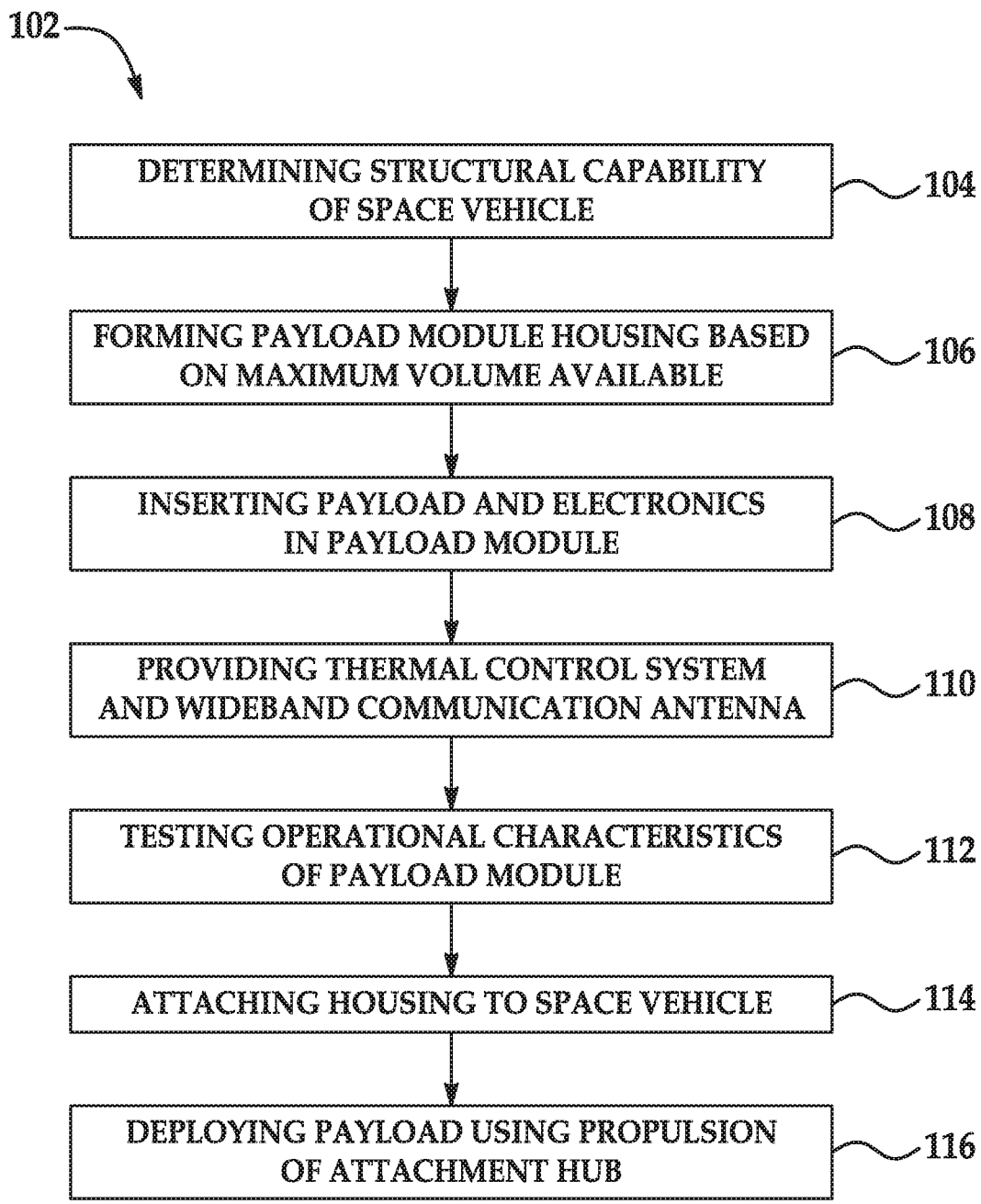
FIG. 14 is a schematic drawing showing a flowchart of a method of deployment of a payload from a propulsive payload adaptor hub according to an embodiment of the present invention.

Referring now to FIG. 14, a method 102 of deployment of the payload 46 (shown in FIGS. 4 and 7-9) from the propulsive payload adaptor hub 32 (shown in FIGS. 3-12) is schematically shown. Step 104 of the method 102 includes determining the structural capability of the aerospace vehicle 36 (shown in FIG. 3) in which the payload module 38 (shown in FIGS. 3-12) is to be integrated. The space vehicle may include the propulsive payload adaptor hub 32 and the primary vehicle 22 (shown in FIG. 3). The structural capability and the maximum volume available for the payload module 38 may be determined as described above. After the structural capability and the maximum volume available for the payload module 38 is determined, step 106 of the method 102 includes forming the housing 44 (shown in FIGS. 4 and 6-12) of the payload module 38 to have a volume that is less than or equal to the maximum volume available.

After the payload module 38 is formed, step 108 of the method 102 includes inserting the payload 46 and payload electronics in the housing 44. Step 108 further includes arranging the payload 46 to have an unhindered circular FOV and arranging the payload 46 within an outer perimeter of the housing 44. Step 110 of the method 102 includes providing the thermal control system 40 (shown in FIGS. 3-12) and the wideband communication antenna 42 (shown in FIGS. 3, 4, and 8). Step 110 further includes inserting the thermal control system 40 in the housing 44 and arranging the thermal control system 40 for communication with the payload 46. Inserting the thermal control system 40 may further include arranging a radiator panel 80 (shown in FIG. 9) on the outer peripheral surface of the housing 44. Providing the wideband communication antenna 42 includes arranging the antenna 42 on the housing 44 and outside of the outer perimeter of the housing 44.

Step 112 of the method 102 includes testing the payload module 38 for at least one operational characteristic before attaching the housing 44 to propulsive payload adaptor hub 32 and the primary vehicle 22. The operational characteristic includes at least one of functional, dynamic, vibration, acoustic, thermal, performance, electromagnetic capability, electromagnetic interference, qualification, and any combination thereof. Providing the self-contained payload module 38 is advantageous in that operational characteristics of the payload module 38 and the payload 46 and the propulsive payload adaptor hub 32 may be independently tested prior to integration with each other. Thus, the failure during the testing of one of the propulsive payload adaptor hub 32 or the payload module 38 will not preclude production and testing of the other of the propulsive payload adaptor hub 32 or the payload module 38. In contrast, conventional payloads would require at least some of the operational characteristic testing, such as functional, dynamics, thermal, electromagnetic capability and interference, to be performed at the final integration site after integration of the payload with the space vehicle. Using the self-contained payload module 38 enables testing of the payload module 38 to be performed by the payload provider prior to reaching the final integration site.

After the payload module 38 and the payload 46 have been tested, step 114 of the method 102 includes attaching the housing 44 to the space vehicle, e.g. propulsive payload adaptor hub or ESPA-class hub 32 and the primary vehicle 22. A propulsive payload adaptor hub for use with the payload module 38 may be selected from a plurality of different propulsive payload adaptor hubs depending on the application or mission such that the payload module 38 may be modular. Step 114 further includes arranging the payload module 38, the ESPA-class hub 32, and the primary vehicle 22 to be coaxially stacked relative to each other. The method may further include using a mechanical interface 70 (shown in FIG. 4) to connect a perimeter of the housing 44 to a perimeter of the ESPA-class hub 32. Step 116 of the method 102 includes deploying the payload 46 using propulsion of the ESPA-class hub 32.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A payload module configured to be arranged in a space vehicle that includes a propulsive payload adapter hub, the propulsive payload adapter hub being releasable from the space vehicle, the payload module comprising:
   a housing that is configured to engage the propulsive payload adapter hub for integration of the payload module and the propulsive payload adapter hub;
   at least one deployable payload that is arranged in an interior cavity of the housing and deployable from the payload module via a power source of the propulsive payload adapter hub when the payload module and the propulsive payload adapter hub are integrated;
   a payload electronics system arranged in the interior cavity;
   a thermal control system in communication with the at least one payload and arranged in the housing; and
   at least one antenna that is arranged on the housing and configured for wideband communication, the payload module being self-contained via the thermal control system and the at least one antenna being arranged in the payload module, the payload module being self-contained to enable testing of operational characteristics of the payload module prior to integration of the payload module and the propulsive payload adapter hub.

2. The payload module according to claim 1, wherein the housing and the interior cavity are cylindrical.

3. The payload module according to claim 2, wherein the at least one payload is arranged within an outer perimeter of the housing and the at least one antenna is mounted to the housing outside the outer perimeter.

4. The payload module according to claim 1, wherein the at least one payload is cylindrical in shape and has a circular field-of-view.

5. The payload module according to claim 1, wherein the thermal control system includes a plurality of radiator panels arranged on an outer peripheral surface of the housing.

6. The payload module according to claim 1 further comprising a hub fastener that is configured to connect a perimeter of the housing to the propulsive payload adapter hub.

7. The payload module according to claim 6, wherein the hub fastener is a ring-shaped clamp band arranged around the perimeter of the housing.

8. The payload module according to claim 6 further comprising a primary vehicle fastener that is arranged on the housing opposite the hub fastener and configured to connect the housing to a primary vehicle opposite the propulsive payload adapter hub.

9. A method of deployment of a payload from a propulsive payload adapter hub, the propulsive payload adapter hub being releasable from a space vehicle, the method comprising:
- inserting at least one deployable payload with payload electronics within an interior cavity of a housing of a payload module configured to be arranged in the space vehicle and integrated with the propulsive payload adapter hub;
- inserting a thermal control system in the housing and arranging the thermal control system for communication with the at least one payload;
- arranging at least one antenna on the housing that is configured for wideband communication;
- attaching the housing to the propulsive payload adapter hub; and
- deploying the payload using the propulsive payload adapter hub via a power source of the propulsive payload adapter hub when the payload module and the propulsive payload adapter hub are integrated, the payload module being self-contained via the thermal control system and the at least one antenna being arranged in the payload module, the payload module being self-contained to enable testing of operational characteristics of the payload module prior to integration of the payload module and the propulsive payload adapter hub.

10. The method according to claim 9 further comprising arranging the at least one payload to have a circular field-of-view.

11. The method according to claim 9 further comprising testing the payload module for at least one of the operational characteristics before attaching the payload housing to the propulsive payload adapter hub, wherein the operational characteristics include, dynamic, vibration, acoustic, thermal, electromagnetic compatibility, and electromagnetic interference.

12. The method according to claim 11 further comprising attaching the payload module to a primary vehicle.

13. The method according to claim 12 further comprising arranging the payload module, the propulsive payload adapter hub, and the primary vehicle to be coaxially stacked relative to each other.

14. The method according to claim 13 further comprising:
- determining a maximum volume available for the payload module based on the a mass and a center of gravity of the primary vehicle and the propulsive payload adapter hub; and
- forming the payload module to have a volume that is less than or equal to the maximum volume available.

15. The method according to claim 9 further comprising arranging the at least one payload within an outer perimeter of the housing and mounting the at least one antenna to the housing outside the outer perimeter.

16. The method according to claim 9 further comprising using a mechanical interface to connect a perimeter of the housing to a perimeter of the propulsive payload adapter hub.

17. The method according to claim 9, wherein inserting the thermal control system in the housing includes arranging a plurality of radiator panels on an outer peripheral surface of the housing.

* * * * *